Patented Feb. 14, 1933

1,897,900

UNITED STATES PATENT OFFICE

ERLING H. HAABESTAD, OF SPRINGFIELD, PENNSYLVANIA, ASSIGNOR TO HYDROL CHEMICAL COMPANY, INC., OF PHILADELPHIA, PENNSYLVANIA, A CORPORATION OF PENNSYLVANIA

COMPOSITION OF MATTER WITH PROCESS FOR TREATING ARTIFICIAL GRASS

No Drawing.   Application filed November 12, 1930.   Serial No. 495,294.

Artificial grass is extensively used around graves at burials, though it can be used under other conditions, and of late it is being used on miniature golf courses.

Artificial grass consists of shredded palm leaves sewed or otherwise fastened on a flexible or pliable backing, such as burlap, canvas, etc.

In connection with artificial grass it is the purpose of the present invention to provide a composition of coloring matter for treating the grass, restoring its lustre, and at the same time simulating the genuine article.

Heretofore the majority of composition coloring matter contained certain ingredients, such as would cause the blades of grass to stick together, and therefore would not present a natural appearance. Such adhesive qualities of the blades of artificial grass is very noticeable when there is considerable humidity or dampness in the air, the grass blades appearing in bunches, on account of the adhesion of the grass blades, instead of giving the appearance of a uniform distribution, so as to conform to the natural appearance of grass.

It is to be understood that the particulars herein given are in no way limitative and that while still keeping within the scope of the invention, any desired modifications of the proportions of the ingredients, or the equivalent for any one or more of the ingredients may be made in the compound of coloring matter, as well as making variations in the process of applying it, such modifications or changes being according to circumstances involved.

The invention comprises further features and combinations to be hereinafter set forth and claimed.

Another purpose is to provide, in a coloring matter and process for treating artificial grass, an improved softening agent acting to produce a restoration of the grass.

In carrying out the process it is the aim to use any conventional type of spraying machine such as will distribute the coloring matter evenly, and yet not apply too much.

The improved composition of coloring matter contains a coloring substance, such as malachite green No. 427 Shultz, and a substitute for this ingredient may be Auramine O No. 425 Shultz, or other coloring.

A requisite quantity of methyl alcohol or denatured alcohol or an equivalent may also be used in the composition of matter. The composition of matter also contains non-volatile hygroscopic chloride, such as calcium chloride or substances which are capable of absorbing moisture from the air to preserve dampness of the material treated, and a substitute therefor may be magnesium chloride, the solution or composition of matter also including a requisite amount of water.

In some instances an alcohol soluble oil such as benzyl-benzoate or Turkey red oil (two parts) may be contained in the composition of coloring matter, the latter ingredient serving to eliminate the dried out appearance of the grass and add to its lustre, a composition of coloring matter of this kind with a hygroscopic material in alcohol acts to restore the faded condition of the grass when sprayed thereon.

Such a composition of matter is capable of absorbing water from the air, without any adhesive qualities in order to produce a slightly moist surface.

Various ingredients are named in the following proportioned parts.

For example:—

1 part malachite green dye or one part of auramine 200 parts methyl alcohol or 200 parts denatured ethyl alcohol 5 parts calcium chloride or 5 parts magnesium chloride 20 parts water.

The dye and the salt act as the restorative agents of the composition, the dye, obviously, to restore the color and the salt as a retainer for moisture to give lustre. But the dye and salt alone, without the solvent employed would not suffice, as the dye generally would not dissolve in water in the presence of appreciable quantities of the salt but would be precipitated in the latter. The use of the solvent employed, however, effects homogeneity of the composition and makes possible the production of a ready-mixed concentrated solution.

The invention having been set forth what is claimed is:

1. A composition for the restoration of the color to artificial grass and to give the same a natural lustre which comprises a concentrated solution of malachite green dye, magnesium chloride and methanol in which the methanol gives homogeneity to the composition and prevents precipitation of the dye.

2. A composition for the restoration of the color to artificial grass and to give the same a natural lustre composed of one part malachite green dye, two hundred parts methanol, five parts magnesium chloride and ten parts water.

In testimony whereof I affix my signature.

ERLING H. HAABESTAD.